(12) United States Patent
Armstrong et al.

(10) Patent No.: US 7,941,803 B2
(45) Date of Patent: May 10, 2011

(54) CONTROLLING AN OPERATIONAL MODE FOR A LOGICAL PARTITION ON A COMPUTING SYSTEM

(75) Inventors: William J. Armstrong, Rochester, MN (US); Richard L. Arndt, Austin, TX (US); David A. Larson, Rochester, MN (US); Naresh Nayar, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1151 days.

(21) Appl. No.: 11/623,219

(22) Filed: Jan. 15, 2007

(65) Prior Publication Data

US 2008/0172554 A1 Jul. 17, 2008

(51) Int. Cl.
G06F 9/455 (2006.01)
(52) U.S. Cl. ............................................................ 718/1
(58) Field of Classification Search ................... 712/209; 718/1, 105
See application file for complete search history.

(56) References Cited

U.S. PATENT DOCUMENTS

| | | | | |
|---|---|---|---|---|
| 7,412,705 | B2 * | 8/2008 | Misra ............................. | 719/312 |
| 7,665,088 | B1 * | 2/2010 | Bugnion et al. .................. | 718/1 |
| 2006/0069534 | A1 | 3/2006 | Kinney | |
| 2007/0006227 | A1 * | 1/2007 | Kinney et al. ..................... | 718/1 |
| 2007/0168535 | A1 * | 7/2007 | Ikonen et al. ................. | 709/230 |
| 2008/0059769 | A1 * | 3/2008 | Rymarczyk et al. .......... | 712/209 |
| 2008/0059782 | A1 * | 3/2008 | Kruse et al. ....................... | 713/1 |
| 2008/0163239 | A1 * | 7/2008 | Sugumar et al. ............... | 718/105 |

OTHER PUBLICATIONS

Bellard, Fabrice, "QEMU, a Fast and Portable Dynamic Translator", Internet Citation, 2005, usenix.org/publications/library/proceedings/usenix05/tech/freenix/full-papers/bellard/bellard.pdf.
Bellard, Fabrice, "QEMU CPU Emulator User Documentation", Jul. 22, 2006, pp. 1-14 web.archive.org/web/20061206052440/fabrice.bellard.free.fr/qemu/qemu-doc.html.
Bellard, Fabrice, "QEMU Internals", Jul. 22, 2006, pp. 1-7 web.archive.org/web/20061207114301/fabrice.bellard.free.fr/qemu/qemu-tech.html.

* cited by examiner

Primary Examiner — Thomas Lee
Assistant Examiner — Eric C Wai
(74) Attorney, Agent, or Firm — Biggers & Ohanian, LLP

(57) ABSTRACT

Methods, apparatus, and products are disclosed for controlling an operational mode for a logical partition on a computing system that include: receiving, in a hypervisor installed on the computing system, a processor compatibility mode for the logical partition and a firmware compatibility mode for the logical partition, the processor compatibility mode specifying a processor architecture version configured for the logical partition, and the firmware compatibility mode specifying a firmware architecture version configured for the logical partition; providing, by the hypervisor for the logical partition, a firmware interface in dependence upon the firmware compatibility mode; and providing, by the hypervisor for the logical partition, a processor interface in dependence upon the processor compatibility mode.

22 Claims, 8 Drawing Sheets

CONTROLLING AN OPERATIONAL MODE FOR A LOGICAL PARTITION ON A COMPUTING SYSTEM

BACKGROUND OF THE INVENTION

1. Field of the Invention

The field of the invention is data processing, or, more specifically, methods, apparatus, and products for controlling an operational mode for a logical partition on a computing system.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One area in which computer software has evolved to take advantage of high performance hardware is a software tool referred to as a 'hypervisor.' A hypervisor is a layer of system software that runs on the computer hardware beneath the operating system layer to allows multiple operating systems to run on a host computer at the same time. Hypervisors were originally developed in the early 1970's, when company cost reductions were forcing multiple scattered departmental computers to be consolidated into a single, larger computer— the mainframe—that would serve multiple departments. By running multiple operating systems simultaneously, the hypervisor brought a measure of robustness and stability to the system. Even if one operating system crashed, the others would continue working without interruption. Indeed, this even allowed beta or experimental versions of the operating system to be deployed and debugged without jeopardizing the stable main production system and without requiring costly second and third systems for developers to work on.

A hypervisor allows multiple operating systems to run on a host computer at the same time by providing each operating system with its own set of computer resources. These computer resources are typically virtualized counterparts to the physical resources of a computing system. A hypervisor allocates these resources to each operating system using logical partitions. A logical partition is a set of data structures and services that enables distribution of computer resources within a single computer to make the computer function as if it were two or more independent computers. Using a logical partition, therefore, a hypervisor provides a layer of abstraction between a computer hardware layer of a computing system and an operating system layer.

Although a hypervisor provides added flexibility in utilizing computer hardware, utilizing a hypervisor does have drawbacks. When a hypervisor provides resources to an operating system through a logical partition, the resources provided through the logical partition may not match the resources required by the operating system. For example, a hypervisor may attempt to provide processing resources according to a particular version of a processor architecture, when the operating system only supports older versions of the processor architecture. Examples of processor architecture versions may include IBM's POWER5™, which is an implementation of version 2.02 of the PowerPC™ processor architecture, and IBM's POWER4™, which is an implementation of version 2.01 of the PowerPC™ processor architecture. Moreover, when a hypervisor migrates a logical partition from one computing system to a target computing system, the computer resources provided by a hypervisor in the target computing system may not match the resources required by the operating system running in the partition. A mismatch between the resources provided by a hypervisor and the resources required by an operating system typically results in partition failure. As such, readers will appreciate that room for improvement exists for controlling an operational mode for a logical partition on a computing system.

SUMMARY OF THE INVENTION

Methods, apparatus, and products are disclosed for controlling an operational mode for a logical partition on a computing system that includes: receiving, in a hypervisor installed on the computing system, a processor compatibility mode for the logical partition and a firmware compatibility mode for the logical partition, the processor compatibility mode specifying a processor architecture version configured for the logical partition, and the firmware compatibility mode specifying a firmware architecture version configured for the logical partition; providing, by the hypervisor for the logical partition, a firmware interface in dependence upon the firmware compatibility mode; and providing, by the hypervisor for the logical partition, a processor interface in dependence upon the processor compatibility mode.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
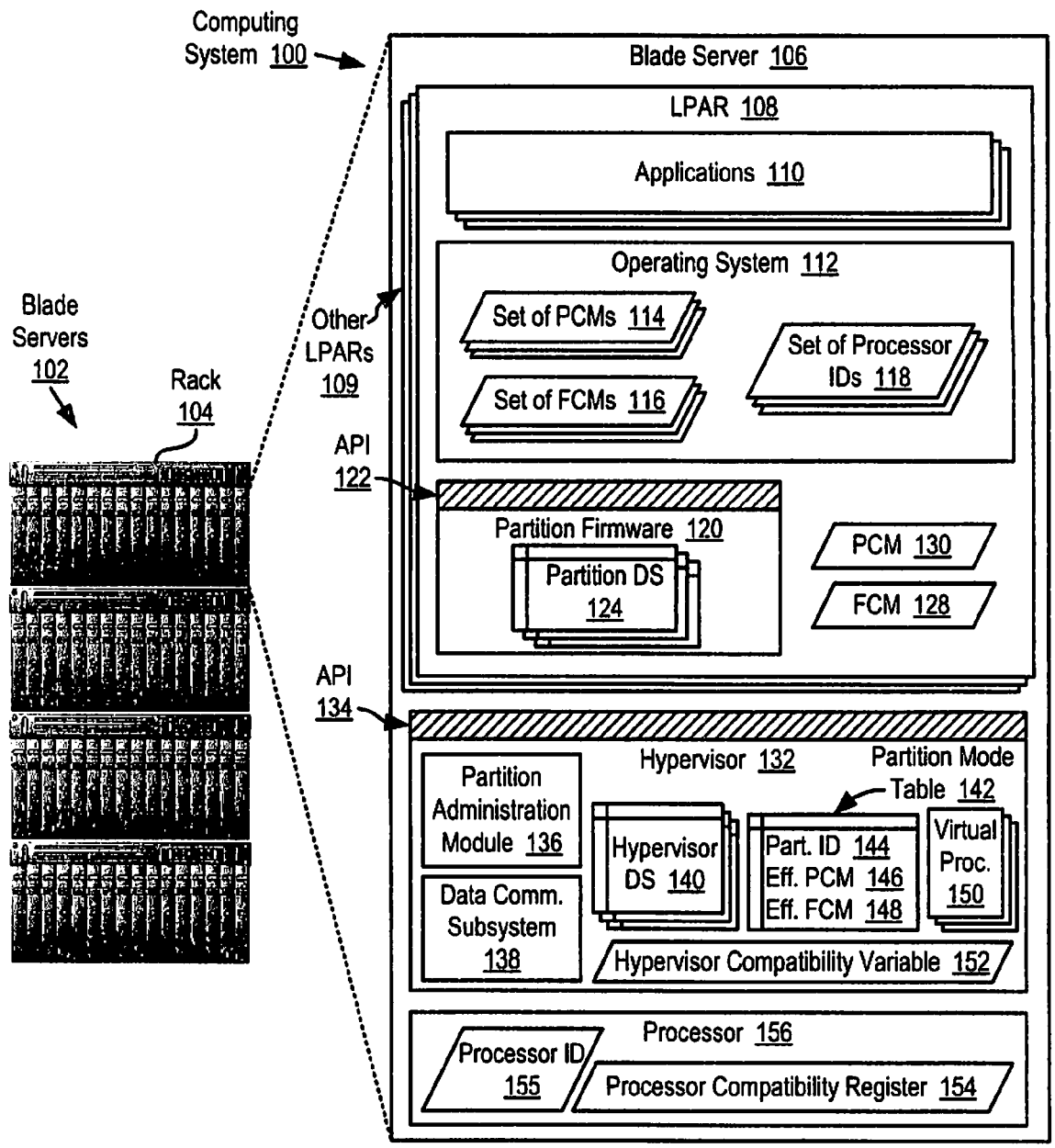
FIG. 1 sets forth a block diagram of an exemplary computing system for controlling an operational mode for a logical partition on a computing system according to embodiments of the present invention.

Exemplary methods, apparatus, and products for controlling an operational mode for a logical partition on a computing system in accordance with the present invention are described with reference to the accompanying drawings, beginning with FIG. 1. FIG. 1 sets forth a block diagram of an exemplary computing system (100) for controlling an operational mode for a logical partition on a computing system according to embodiments of the present invention. The exemplary computing system (100) of FIG. 1 operates a logical partition on a computing system according to embodiments of the present invention as follows: A hypervisor (132) installed on the computing system (100) receives a processor compatibility mode (130) for a logical partition (108) and a firmware compatibility mode (128) for the logical partition (108). The processor compatibility mode (130) specifies a processor architecture version configured for the logical partition (108), and the firmware compatibility mode (128) specifies a firmware architecture version configured for the logical partition (108). The hypervisor (132) of FIG. 1 provides a firmware interface for the logical partition (108) in dependence upon the firmware compatibility mode (128) for the logical partition (108). The hypervisor (132) provides a processor interface for the logical partition (108) in dependence upon the processor compatibility mode (130) for the logical partition (108).

In the example of FIG. 1, the computing system (100) includes logical partitions (108, 109). The logical partition (108) provides an execution environment for applications (110) and an operating system (112). Each application (110) is a set of computer program instructions implementing user-level data processing. The operating system (112) of FIG. 1 is system software that manages the resources allocated to the logical partition (108) by the hypervisor (132). The operating system (112) performs basic tasks such as, for example, controlling and allocating virtual memory, prioritizing the processing of instructions, controlling virtualized input and output devices, facilitating networking, and managing a virtualized file system.

The hypervisor (132) of FIG. 1 is a layer of system software that runs on the computer hardware beneath the operating system layer to allows multiple operating systems to run on a host computer at the same time. The hypervisor (132) provides each operating system with a set of computer resources using the logical partitions. A logical partition ('LPAR') is a set of data structures and services provided to a single operating system that enables the operating system to run concurrently with other operating systems on the same computer hardware. In effect, the logical partitions allow the distribution of computer resources within a single computer to make the computer function as if it were two or more independent computers.

The hypervisor (132) of FIG. 1 establishes each logical partition using a combination of data structures and services provided by the hypervisor (132) itself along with partition firmware (120). The partition firmware (120) of FIG. 1 is system software specific to the partition (108) that is often referred to as a 'dispatchable hypervisor.' The partition firmware (120) maintains partition-specific data structures (124) and provides partition-specific services to the operating system (112) through application programming interface ('API') (122). The hypervisor (132) maintains data structures (140) and provides services to the operating systems and partition firmware for each partition through API (134). Collectively, the hypervisor (132) and the partition firmware (120) are referred to in this specification as 'firmware' because both the hypervisor (132) and the partition firmware (120) are typically implemented as firmware. Together the hypervisor (132) and the partition firmware (120) enforce logical partitioning between one or more operating systems by storing state values in various hardware registers and other structures, which define the boundaries and behavior of the logical partitions. Using such state data, the hypervisor (132) and the partition firmware (120) may allocate memory to logical partitions, route input/output between input/output devices and associated logical partitions, provide processor-related services to logical partition, and so on. Essentially, this state data defines the allocation of resources in logical partitions, and the allocation is altered by changes the state data rather than by physical reconfiguration of hardware.

In order to allow multiple operating systems to run at the same time, the hypervisor (132) assigns virtual processors (150) to the operating system running in the logical partition (108) and schedules virtual processors (150) on one or more physical processors of the computing system (100). A virtual processor is a subsystem that implements assignment of processor time to a logical partition. A shared pool of physical processors supports the assignment of partial physical processors (in time slices) to each logical partition. Such partial physical processors shared in time slices are referred to as 'virtual processors.' A thread of execution is said to run on a virtual processor when it is running on the virtual processor's time slice of the physical processors. Sub-processor partitions time-share a physical processor among a set of virtual processors, in a manner that is invisible to an operating system running in a logical partition. Unlike multiprogramming within the operating system where a thread can remain in control of the physical processor by running the physical processor in interrupt-disabled mode, in sub-processor partitions, the thread is still pre-empted by the hypervisor (132) at the end of its virtual processor's time slice, in order to make the physical processor available to a different virtual processor.

In the exemplary computing system (100) of FIG. 1, the hypervisor (132) includes a partition administration module (136) that manages the logical partitions on the computing system (100). The partition administration module (136) includes a set of computer program instructions for controlling an operational mode for a logical partition on a computing system according to embodiments of the present invention. The partition administration module (136) generally operates a logical partition on a computing system according to embodiments of the present invention by receiving a processor compatibility mode (130) for the logical partition (108) and a firmware compatibility mode (128) for the logical partition (108), providing a firmware interface for the logical partition (108) in dependence upon the firmware compatibility mode (128), and providing a processor interface for the logical partition (108) in dependence upon the processor compatibility mode (130).

The processor interface is a set of processor-related data structures and services provided by the hypervisor (132), the partition firmware (120), and a physical processor (156) for a logical partition. The processor interface may include processor-related data structures and services regarding the operational mode of a processor, the processor register values, state information for processes, and so on. As mentioned above, the hypervisor (132) provides a processor interface in dependence upon the processor compatibility mode (130). The processor compatibility mode (130) represents a value that specifies a processor architecture version supported by a particular logical partition. Using the processor compatibility mode (130) for a particular logical partition, a hypervisor may provide a processor interface for the logical partition according to a processor architecture version supported by the operating system running in the partition. The hypervisor may adjust the processor interface for a logical partition by changing the values stored in a processor compatibility register (154).

The processor (156) of FIG. 1 includes the processor compatibility register (154) for controlling the version of the processor architecture version according to which the processor (156) operates. The processor compatibility register (154) of FIG. 1 is only accessible to super-privileged code such as the hypervisor (132). By setting bits in the processor compatibility register (154), the hypervisor (132) may specify the processor architecture version according to which the processor (156) operates. Consider, for example, the following 64-bit processor compatibility register in which the three low-order bits are used to specify the processor architectural according to which the processor operates:

| Reserved | v3 | v2 | v1 |
|---|---|---|---|
| 0 | 60 | 61 | 62 | 63 |

In the exemplary processor compatibility register above, each defined bit represents a particular processor architecture version in a family of processor architectures. For example, bit 63 may represent the 2.01 version of the IBM PowerPC™ processor architecture, bit 62 may represent the 2.02 version of the IBM PowerPC™ processor architecture, and bit 61 may represent the 2.03 version of the IBM PowerPC™ processor architecture. Setting a defined bit disables the facilities that are new in the corresponding processor architecture version from the previous processor architecture version. Continuing with the exemplary IBM PowerPC™ processor architecture versions above, storing a value of '0 . . . 000' in the exemplary processor compatibility register specifies operating the processor according to the 2.03 version because no processor facilities are disabled. Storing a value of '0 . . . 100' in the exemplary processor compatibility register specifies operating the processor according to the 2.02 version because the processor new processor facilities provided by the 2.03 version are disabled. Storing a value of '0 . . . 110' in the exemplary processor compatibility register specifies operating the processor according to the 2.01 version because the new processor facilities provided by the 2.03 and 2.02 versions are disabled. In addition to disabling facilities in the more recent versions of a processor architecture when defined bits are set, setting a defined bit may also enable facilities in previous processor architectures that were removed in more recent versions. Readers will note that the exemplary processor compatibility register and the values described above are for explanation only and not for limitation.

The firmware interface is a set of non-processor-related data structures and services provided by the hypervisor (132) and the partition firmware (120) for a logical partition. The firmware interface may include non-processor related data structures and services regarding, for example, firmware interfaces to computer memory, computer buses, adapters, file systems, networking, input/output devices, and so on. The firmware interface may also include functions of APIs (122, 134) of the hypervisor (132) and partition firmware (120). In IBM parlance, such functions of the partition firmware (120) API (122) are referred to as 'Run Time Abstraction Services). As mentioned above, the hypervisor (132) provides a firmware interface in dependence upon the firmware compatibility mode (128). The firmware compatibility mode (128) represents a value that specifies a firmware architecture version supported by a particular logical partition. Using the firmware compatibility mode (128) for a particular logical partition, a hypervisor may provide a firmware interface for the logical partition according to a firmware architecture version supported by the operating system running in the partition. The hypervisor may adjust the firmware interface for a logical partition by altering the value stored in the hypervisor compatibility variable (152). Altering the value stored in the hypervisor compatibility variable (152) changes the data structures and APIs available to the operating system (112). Unlike the processor compatibility register, the firmware interface is typically controlled via a software mechanism only. The software mechanisms include data structures that are presented to the operating system and the APIs provided by the hypervisor and partition firmware.

In some computing systems, an older operating system running in the logical partition might not support the processor interface provided according to the processor compatibility mode configured in the logical partition. In such computing systems, a hypervisor may have to adjust the processor interface to comport with processor compatibility modes supported by the operating system in the logical partition when the operating system loads during the boot sequence. In the exemplary system of FIG. 1, therefore, the partition administration module (136) of the hypervisor (132) operates a logical partition on a computing system according to embodiments of the present invention by receiving, from the operating system (112) running in the logical partition (108), a set (114) of processor compatibility modes supported by the operating system (112), determining an effective processor compatibility mode (146) in dependence upon the processor compatibility mode (130) for the logical partition (108) and the set (114) of processor compatibility modes supported by the operating system (112), and adjusting the processor interface provided to the logical partition (108) in dependence upon the effective processor compatibility mode (146). The effective processor compatibility mode (146) represents a value specifying the processor architecture version supported by the operating system (112) that most closely matches the processor architecture version specified by the processor compatibility mode (130) for the logical partition (108).

In a similar manner, an older operating system running in the logical partition on some computing systems might not support the firmware interface provided according to the firmware compatibility mode configured in the logical partition. In such computing systems, a hypervisor may have to adjust the firmware interface to comport with firmware compatibility modes supported by the operating system in the logical partition when the operating system loads during the boot sequence. In the exemplary system of FIG. 1, therefore, the partition administration module (136) also operates a logical partition on a computing system according to embodiments of the present invention by receiving, from the operating system (112) running in the logical partition (108), a set (116) of firmware compatibility modes supported by the operating system (112), determining an effective firmware compatibility mode (148) in dependence upon the firmware compatibility mode (128) for the logical partition (108) and the set (116) of firmware compatibility modes supported by the operating system (112), and adjusting (804), by the hypervisor (132), the firmware interface provided to the logical partition (108) in dependence upon the effective firmware compatibility mode (148). The effective firmware compatibility mode (148) represents a value specifying the firmware architecture version supported by the operating system (112) that most closely matches the firmware architecture version specified by the firmware compatibility mode (128) for the logical partition (108).

The hypervisor (132) of FIG. 1 includes a partition mode table (142) for storing the effective processor compatibility mode (146) and the effective firmware compatibility mode (148) for each logical partition on the computing system (100). Each record of the table (142) associates a partition identifier (144) for a logical partition with the effective processor compatibility mode (146) and the effective firmware compatibility mode (148) for the logical partition.

When the operating system (112) of FIG. 1 loads during the boot sequence, the hypervisor (132) of FIG. 1 may ensure that the operating system (112) supports the processor (156) on which the operating system (112) executes. In the exemplary system of FIG. 1, therefore, the partition administration module (136) operates a logical partition on a computing system according to embodiments of the present invention by receiving, during a boot sequence from an operating system (112) in the logical partition (108), a set (118) of processor identifiers for computer processors supported by the operating system (112) running in the logical partition (108), identifying a processor performing the boot sequence for the operating system (112), and administering the boot sequence in dependence upon the set (118) of processor identifiers for computer processors supported by the operating system (112) and the processor identifier (155) performing the boot sequence for the operating system (112). The processor identifier (155) is an identifier included in the processor (156) for identifying the particular processor installed in the computing system (100). For example, the processor identifier (155) may identify a processor as an IBM® POWER5™ processor or an Intel® Itanium® 2 processor along with other identification data as will occur to those of skill in the art.

In the example of FIG. 1, the hypervisor (132) may migrate the logical partition (108) from the computing system (100) to another computing system because of predictive (non-fatal) failures on computing system (100), because additional resources are needed to operate the logical partition (108), because hardware or firmware maintenance is required on the computing system, or because of workload balancing needs. Before migrating the logical partition to the target computing system, the hypervisor (132) may ensure that the target computing system is capable of operating according to the processor compatibility mode (130) and the firmware compatibility mode (128) for the logical partition (108). The partition administration module (136) of FIG. 1, therefore, includes a set of computer program instructions configured for controlling an operational mode for a logical partition on a computing system according to embodiments of the present invention by identifying a migration condition that specifies a condition for migrating the logical partition (108) from the computing system (100) to a target computing system, identifying a processor architecture version for the target computing system, identifying a firmware architecture version for the target computing system, determining whether to migrate the logical partition (108) from the computing system to the target computer system in dependence upon the migration condition, the processor compatibility mode (130), the firmware compatibility mode (128), the processor architecture version for the target computing system, and the firmware architecture version for the target computing system, and administering migration of the logical partition (108) from the computing system to the target computer system in dependence upon the determination. In such a manner, the migration is allowed if the target computing system supports the processor compatibility mode and the firmware compatibility mode of the logical partition (108).

The hypervisor (132) of FIG. 1 includes a data communications subsystem (138) for implementing data communication with a target computing system. In particular, the data communications subsystem (138) of FIG. 1 implements data communications with a hypervisor installed on the target computing system. The data communications subsystem (138) may implement the data communications with a target computing system according to the Transmission Control Protocol ('TCP'), the User Datagram Protocol ('UDP'), the Internet Protocol ('IP'), or any other data communications protocols as will occur to those of skill in the art. In addition, the data communications subsystem (138) may also implement data communications with a hypervisor on a target computing system through a pair of special logical partitions, one on each computing system. Data is transferred between these special logical partitions according to the TCP/IP protocols, UDP/IP protocols, or any other data communications protocols as will occur to those of skill in the art.

In addition to migrating the logical partition to a target computing system that is capable of operating according to the processor compatibility mode (130) and the firmware compatibility mode (128) supported by the logical partition (108), the hypervisor (132) may further ensure that the target computing system includes a computer processor supported by the supported by the operating system (112). The partition administration module (136) of FIG. 1, therefore, includes a set of computer program instructions configured for controlling an operational mode for a logical partition on a computing system according to embodiments of the present invention by receiving, from the operating system (112) running in the logical partition (108), a set (118) of processor identifiers for computer processors supported by the operating system (112), identifying a migration condition specifying a condition for migrating the logical partition (108) from the computing system to a target computing system, identifying a processor of the target computing system, determining whether to migrate the logical partition (108) from the computing system to the target computer system in dependence upon the migration condition, the identified processor for the target computing system, and the set (118) of processor identifiers for computer processors supported by the operating system (112), and administering the migration of the logical partition (108) from the computing system to the target computer system in dependence upon the determination.

In the example of FIG. 1, the exemplary computing system (100) is implemented as a blade server (106) installed in a computer rack (104) along with other blade servers (102). Each blade server (102, 106) installed in the rack (104) of FIG. 1 is a computer processing device that executes computer program instructions. Each blade server (102, 106) includes one or more computer processors and computer memory operatively coupled to the computer processors. The blade servers (102, 106) of FIG. 1 are installed in server chassis that are, in turn, mounted on the computer rack (104). Readers will note that implementing the computing system (100) as blade servers is for explanation and not for limitation.

In fact, the computing system of FIG. 1 may be implemented as a workstation, a node of a computer cluster, a compute node in a parallel computer, or any other implementation as will occur to those of skill in the art.

Controlling an operational mode for a logical partition on a computing system in accordance with the present invention is generally implemented with computers, that is, with automated computing machinery. In the system of FIG. 1, for example, all the nodes, servers, and communications devices are implemented to some extent at least as computers. For further explanation, therefore, FIG. 2 sets forth a block diagram of automated computing machinery comprising an exemplary computing system (100) useful in controlling an operational mode for a logical partition on a computing system according to embodiments of the present invention. The computing system (100) of FIG. 2 includes at least one computer processor (156) or 'CPU' as well as random access memory (168) ('RAM') which is connected through a high speed memory bus (166) and bus adapter (158) to processor (156) and to other components of the computing system.

Stored in RAM (168) are logical partitions (108, 109) and a hypervisor (132) that exposes an API (134). Each logical partition (108, 109) is a set of data structures and services that enables distribution of computer resources within a single computer to make the computer function as if it were two or more independent computers. The logical partition (108) includes application (110), an operating system (112), and partition firmware that exposes an API (122). The hypervisor (132) includes a partition administration module (136), virtual processors (150), a data communications subsystem (138), and other components not shown. Operating systems useful in computing systems according to embodiments of the present invention include UNIX™, Linux™, Microsoft XP™, IBM's AIX™, IBM's i5/OS™, and others as will occur to those of skill in the art.

Figure 2:
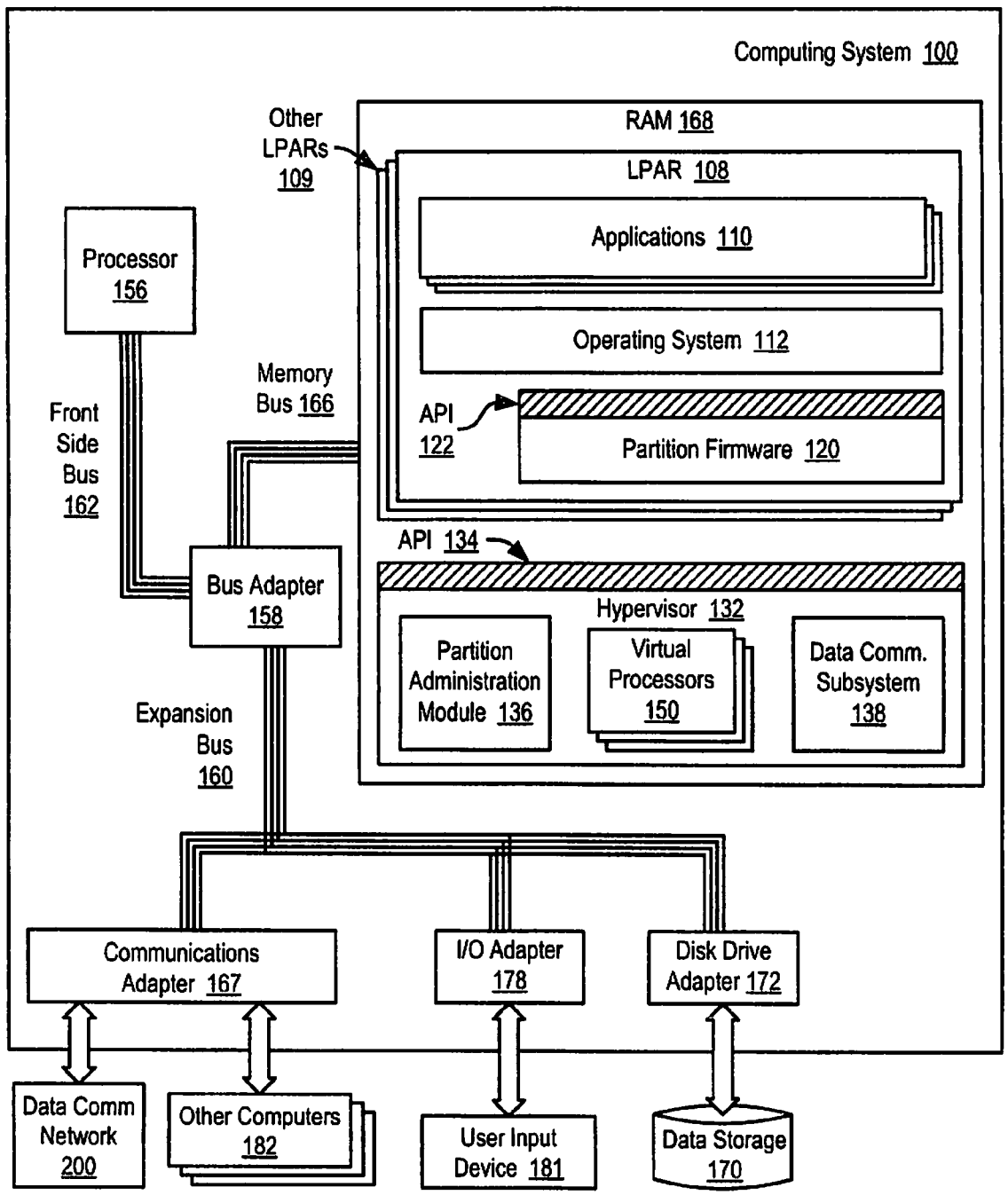
FIG. 2 sets forth a block diagram of automated computing machinery comprising an exemplary computing system useful in controlling an operational mode for a logical partition on a computing system according to embodiments of the present invention.

The applications (110), the operating system (112), the partition firmware (120), and the hypervisor (132) including the partition administration module (136), the virtual processors (150), and the data communications subsystem (138) illustrated in FIG. 2 are software components, that is computer program instructions, that operate as described above with reference to FIG. 1. The logical partitions (108, 109), the applications (110), the operating system (112), the partition firmware (120), and the hypervisor (132) including the partition administration module (136), the virtual processors (150), and the data communications subsystem (138) in the example of FIG. 2 are shown in RAM (168), but many components of such software typically are stored in non-volatile memory also, for example, on a disk drive (170).

The exemplary computing system (100) of FIG. 2 includes bus adapter (158), a computer hardware component that contains drive electronics for high speed buses, the front side bus (162) and the memory bus (166), as well as drive electronics for the slower expansion bus (160). Examples of bus adapters useful in computing systems useful according to embodiments of the present invention include the Intel Northbridge, the Intel Memory Controller Hub, the Intel Southbridge, and the Intel I/O Controller Hub. Examples of expansion buses useful in computing systems useful according to embodiments of the present invention may include Peripheral Component Interconnect ('PCI') buses and PCI Express ('PCIe') buses.

Although not depicted in the exemplary computing system (100) of FIG. 2, the bus adapter (158) may also include drive electronics for a video bus that supports data communication between a video adapter and the other components of the computing system (100). FIG. 2 does not depict such video components because a computing system is often implemented as a blade server installed in a server chassis or a node in a parallel computer with no dedicated video support. Readers will note, however, that computing systems useful in embodiments of the present invention may include such video components.

The exemplary computing system (100) of FIG. 2 also includes disk drive adapter (172) coupled through expansion bus (160) and bus adapter (158) to processor (156) and other components of the exemplary computing system (100). Disk drive adapter (172) connects non-volatile data storage to the exemplary computing system (100) in the form of disk drive (170). Disk drive adapters useful in computing systems include Integrated Drive Electronics ('IDE') adapters, Small Computer System Interface ('SCSI') adapters, and others as will occur to those of skill in the art. In addition, non-volatile computer memory may be implemented for a computing system as an optical disk drive, electrically erasable programmable read-only memory (so-called 'EEPROM' or 'Flash' memory), RAM drives, and so on, as will occur to those of skill in the art.

The exemplary computing system (100) of FIG. 2 includes one or more input/output ('I/O') adapters (178). I/O adapters in computing systems implement user-oriented input/output through, for example, software drivers and computer hardware for controlling output to display devices such as computer display screens, as well as user input from user input devices (181) such as keyboards and mice. Although not depicted in the example of FIG. 2, computing systems in other embodiments of the present invention may include a video adapter, which is an example of an I/O adapter specially designed for graphic output to a display device such as a display screen or computer monitor. A video adapter is typically connected to processor (156) through a high speed video bus, bus adapter (158), and the front side bus (162), which is also a high speed bus.

The exemplary computing system (100) of FIG. 2 includes a communications adapter (167) for data communications with other computing systems (182) and for data communications with a data communications network (200). Such data communications may be carried out through Ethernet connections, through external buses such as a Universal Serial Bus ('USB'), through data communications networks such as IP data communications networks, and in other ways as will occur to those of skill in the art. Communications adapters implement the hardware level of data communications through which one computing system sends data communications to another computing system, directly or through a data communications network. Examples of communications adapters useful for controlling an operational mode for a logical partition on a computing system according to embodiments of the present invention include modems for wired dial-up communications, IEEE 802.3 Ethernet adapters for wired data communications network communications, and IEEE 802.11b adapters for wireless data communications network communications.

Figure 3:
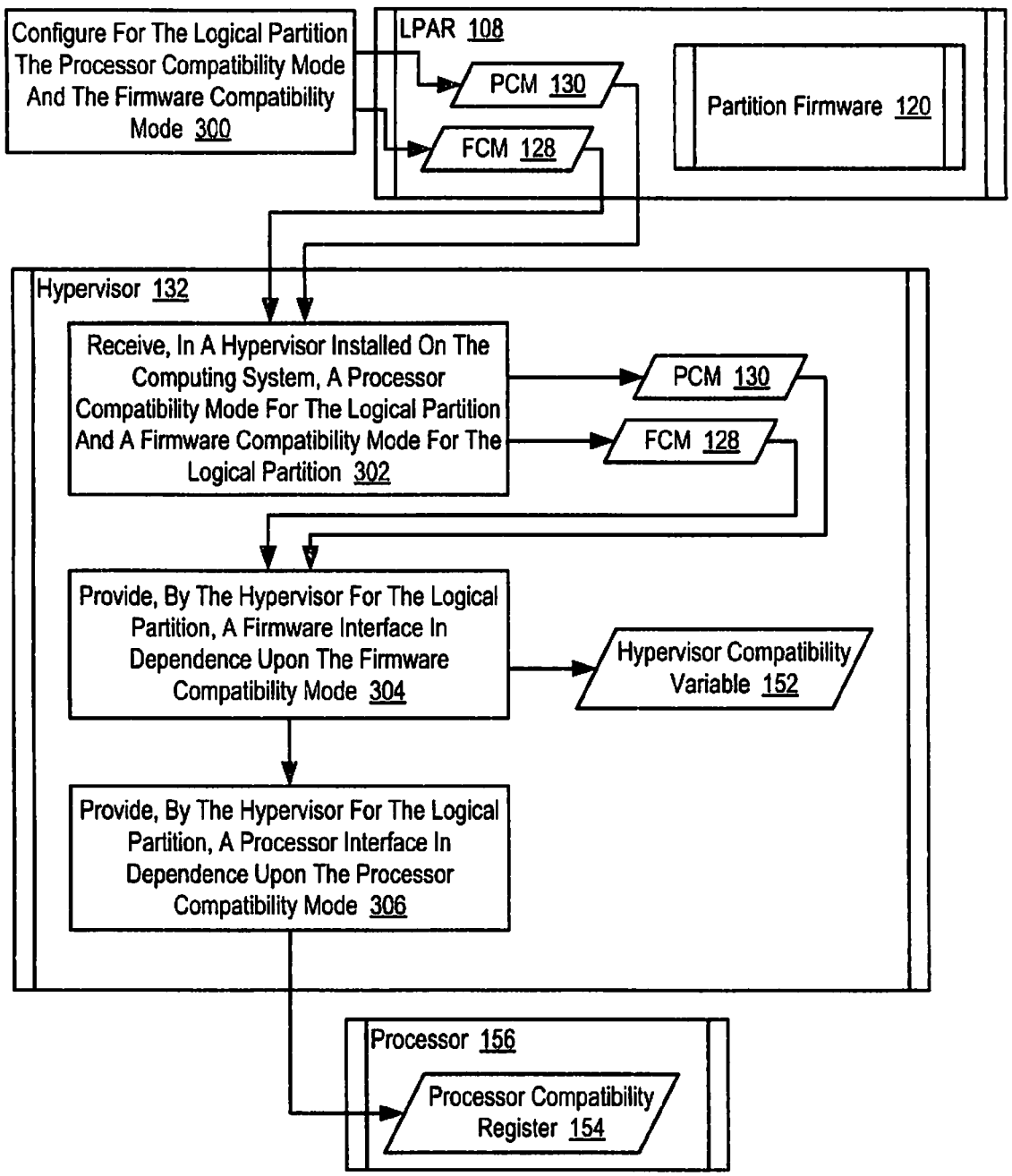
FIG. 3 sets forth a flow chart illustrating an exemplary method for controlling an operational mode for a logical partition on a computing system according to embodiments of the present invention.

For further explanation, FIG. 3 sets forth a flow chart illustrating an exemplary method for controlling an operational mode for a logical partition on a computing system according to embodiments of the present invention. The method of FIG. 3 includes configuring (300) for a logical partition (108) a processor compatibility mode (130) and a firmware compatibility mode (128). The processor compatibility mode (130) represents a value that specifies a processor architecture version configured for the logical partition (108), and the firmware compatibility mode (128) represents a value that specifies a firmware architecture version configured for the logical partition (108). The processor compatibility mode (130) may specify a processor architecture version configured for the logical partition (108) using a value scheme similar to the processor compatibility register as discussed above. Similarly, the firmware compatibility mode (128) may specify a firmware architecture version configured for the logical partition (108) using a value scheme similar to the processor compatibility register as discussed above. A system administrator may configure (300) the processor compatibility mode (130) and the firmware compatibility mode (128) for the logical partition (108) when the administrator establishes a partition configuration definition by storing values for the processor compatibility mode (130) and the firmware compatibility mode (128) in predefined fields of the partition configuration definition.

The method of FIG. 3 also includes receiving (302), in a hypervisor (132) installed on the computing system, a processor compatibility mode (130) for the logical partition (108) and a firmware compatibility mode (128) for the logical partition (108). The hypervisor (132) may receive the processor compatibility mode (130) and the firmware compatibility mode (128) according to the method of FIG. 3 by retrieving the processor compatibility mode (130) and the firmware compatibility mode (128) from predefined fields in the partition configuration definition.

The method of FIG. 3 includes providing (304), by the hypervisor (132) for the logical partition (108), a firmware interface in dependence upon the firmware compatibility mode (128). The hypervisor (132) may provide (304) a firmware interface for the logical partition (108) in dependence upon the firmware compatibility mode (128) according to the method of FIG. 3 by storing the value for the firmware compatibility mode (128) in hypervisor memory such as, for example, a hypervisor compatibility variable (152). Based on the value stored in the hypervisor compatibility variable (152), the hypervisor (132) and the partition firmware (120) may provide data structures and APIs to an operating system running in the logical partition (108) such that the data structures and the APIs emulate the version of firmware architecture specified by the values stored in the hypervisor compatibility variable (152).

The method of FIG. 3 also includes providing (306), by the hypervisor (132) for the logical partition (108), a processor interface in dependence upon the processor compatibility mode (130). The hypervisor (132) may provide (306) a processor interface for the logical partition (108) in dependence upon the processor compatibility mode (130) according to the method of FIG. 3 by storing the value for the processor compatibility mode (130) in the processor compatibility register (154) of the physical processor (156) when executing computer program instructions for the logical partition (108). Based on the value stored in the processor compatibility register (154), the hypervisor may provide the data structures and APIs to an operating system and applications running in the logical partition (108) such that the data structures and APIs emulate the processor architecture version specified by the value stored in the processor compatibility register (154). The hypervisor (132) may also dispatch virtual processors for an operating system running on the logical partition (108) to the physical processor (156) to execute computer instructions according to the processor architecture version specified by the value stored in the processor compatibility register (154).

As mentioned above, a hypervisor occasionally migrates a logical partition from one computing system to another because of a failure on the host computing system, because the host computing system can provide adequate computing resources to support the logical partition, because of system maintenance, or because of workload balancing needs. When a hypervisor migrates a logical partition to a target computing system, the hypervisor may determine whether to migrate the logical partition from the computing system to the target computer system in dependence upon the processor architecture version for the target computing system and the firmware architecture version for the target computing system. For further explanation, therefore, FIG. 4 sets forth a flow chart illustrating a further exemplary method for controlling an operational mode for a logical partition on a computing system (100) according to embodiments of the present invention that includes identifying (400) a migration condition (402) by a hypervisor (132). The migration condition (402) of FIG. 4 represents a condition for migrating the logical partition from the computing system (100) to a target computing system.

Figure 4:
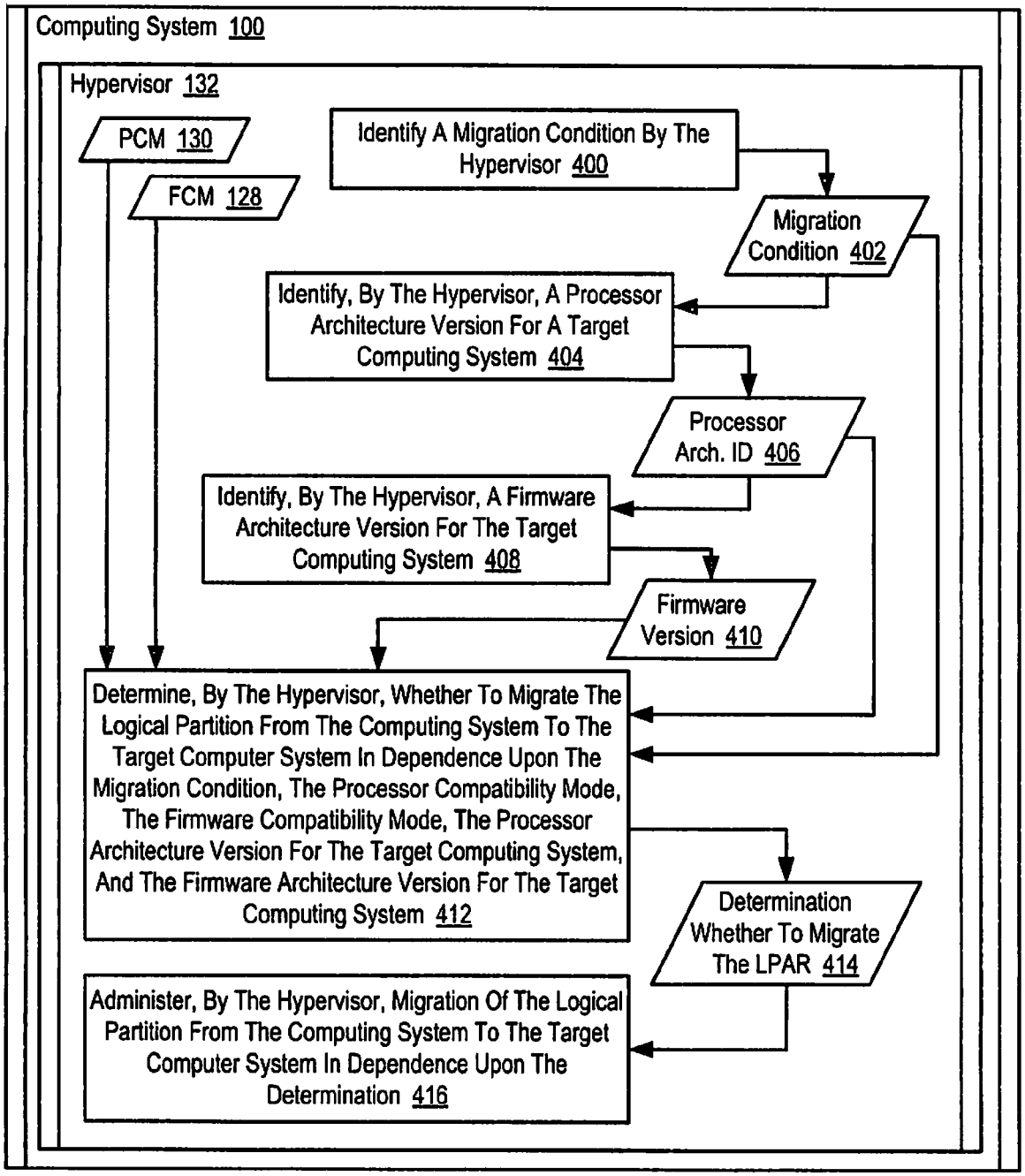
FIG. 4 sets forth a flow chart illustrating a further exemplary method for controlling an operational mode for a logical partition on a computing system according to embodiments of the present invention.

When the hypervisor (132) migrates logical partition (108) because of a failure on the computing system (100), the hypervisor (132) may identify (400) a migration condition (402) according to the method of FIG. 4 by repeatedly detecting system failures and comparing the number of detected failures to a predetermined threshold. Examples of a system failure may include encountering an error when reading or writing to a block of computer memory, encountering an error when executing computer program instructions, or any other system error as will occur to those of skill in the art. In such an embodiment, the hypervisor (132) may identify that a migration condition is satisfied when the number of detected failures is greater than the predetermined threshold.

When the hypervisor (132) migrates logical partition (108) because the host computing system can provide adequate computing resources to support the logical partition, the hypervisor (132) may identify (400) a migration condition (402) according to the method of FIG. 4 by repeatedly measuring system performance and comparing the measured performance to a predetermined threshold. Examples of system performance may include the rate at which page swaps occur, the number of processes waiting for execution, or any other system error as will occur to those of skill in the art. In such an embodiment, the hypervisor (132) may identify that a migration condition is satisfied when system performance metrics fall below or rise above the predetermined threshold, depending on the particular aspect of system performance measured.

The method of FIG. 4 includes identifying (404), by the hypervisor (132), a processor architecture version (406) for the target computing system. The hypervisor (132) may identify (404) a processor architecture version for the target computing system according to the method of FIG. 4 by requesting a hypervisor installed on the target computing system to retrieve a processor architecture version identifier (406) from a processor identification register and return the processor architecture version identifier (406) to the hypervisor (132) installed on the computer system (100). The hypervisor (132) may issue such a request through a data communications connection established with a hypervisor installed on the target computing system according to a data communications protocol such as, for example, TCP/IP, UDP/IP, or any other data communications protocols as will occur to those of skill in the art. In addition, the hypervisor (132) may also retrieve the retrieve a processor architecture version identifier (406) using a pair of special logical partitions used for data communications between the hypervisor (132) and the hypervisor installed on the target computing system.

The method of FIG. 4 also includes identifying (408), by the hypervisor (132), a firmware architecture version (410) for the target computing system. The hypervisor (132) may identify (408) a firmware architecture version (410) for the target computing system according to the method of FIG. 4 by requesting a hypervisor installed on the target computing system to retrieve the firmware architecture version (410) from firmware installed in the target computing system and return the firmware architecture version (410) to the hypervisor (132) installed on the computer system (100). The hypervisor (132) may issue such a request through a data communications connection established with a hypervisor installed on the target computing system according to a data communications protocol such as, for example, TCP/IP, UDP/IP, or any other data communications protocols as will occur to those of skill in the art. The hypervisor (132) may also retrieve the retrieve a firmware architecture version identifier (410) using a pair of special logical partitions used for data communications between the hypervisor (132) and the hypervisor installed on the target computing system.

The method of FIG. 4 includes determining (412), by the hypervisor (132), whether to migrate the logical partition from the computing system (100) to the target computer system in dependence upon the migration condition (402), the processor compatibility mode (130), the firmware compatibility mode (128), the processor architecture version (406) for the target computing system, and the firmware architecture version (410) for the target computing system. The hypervisor (132) may determine (412) whether to migrate the logical partition (108) from the computing system (100) to the target computer system according to the method of FIG. 4 by determining whether the processor architecture version for the target computing environment identified by identifier (406) matches the processor architecture version specified by the processor compatibility mode (130) for the logical partition (108) and by determining whether the firmware architecture version (410) for the target computing environment matches the firmware architecture version specified by the firmware compatibility mode (128) for the logical partition (108). The hypervisor (132) of FIG. 1 may determine to migrate the logical partition (108) from the computing system (100) to the target computer system if the processor architecture version identified by identifier (406) matches the processor architecture version specified by the processor compatibility mode (130) and the firmware architecture version (410) matches the firmware architecture version specified by the firmware compatibility mode (128). In contrast, the hypervisor (132) of FIG. 1 may determine not to migrate the logical partition (108) from the computing system (100) to the target computer system if the processor architecture version identified by identifier (406) does not match the processor architecture version specified by the processor compatibility mode (130) or the firmware architecture version (410) does not match the firmware architecture version specified by the firmware compatibility mode (128). The hypervisor (132) of FIG. 1 may store an indication of whether to migrate the logical partition (108) from the computing system (100) to the target computer system in determination (414).

Although FIG. 4 is discussed with reference to the hypervisor (132) determining whether to migrate the logical partition from the computing system (100) to the target computer system, readers will note that a determination whether to migrate the logical partition may be carried out by the hypervisor installed on the target computing system. In such an embodiment, the hypervisor (132) transmits the processor compatibility mode (130) and the firmware compatibility mode (128) to the hypervisor of the target computing system and allows the hypervisor of the target computing system to determine whether to migrate the logical partition from the computing system (100) to the target computer system in dependence upon the processor compatibility mode (130), the firmware compatibility mode (128), the processor architecture version (406) for the target computing system, and the firmware architecture version (410) for the target computing system. The hypervisor of the target computing system may then return to the hypervisor (132) a value indicating the determination (414) whether to migrate the logical partition.

The method of FIG. 4 also includes administering (416), by the hypervisor (132), migration of the logical partition from the computing system to the target computer system in dependence upon the determination (414). The hypervisor (132) may administer (416) migration of the logical partition (108) from the computing system (100) to the target computer system according to the method of the FIG. 4 by allowing the migration of the logical partition (108) from the computing system (100) to the target computer system if the determination (414) indicates that the hypervisor (132) determined to migrate the logical partition (108). The hypervisor (132) may also administer (416) migration of the logical partition (108) from the computing system (100) to the target computer system according to the method of the FIG. 4 by preventing the migration of the logical partition (108) from the computing system (100) to the target computer system if the determination (414) indicates that the hypervisor (132) determined not to migrate the logical partition (108). In such a manner, administering (416) migration of the logical partition (108) advantageously prevents the migration of the logical partition (108) to a target computing system not supported by the logical partition (108) and advantageously reduces the likelihood of a partition failure during migration.

In addition to preventing the migration of a logical partition to a target computing system not supported by the logical partition, a hypervisor may also prevent the migration if the target computing environment is not supported by an operating system running in the logical partition. For further explanation, therefore, FIG. 5 sets forth a flow chart illustrating a further exemplary method for controlling an operational mode for a logical partition on a computing system (100) according to embodiments of the present invention that includes receiving (500), in the hypervisor (132) from an operating system (112) running in the logical partition (108), a set (118) of processor identifiers for computer processors supported by the operating system (112). The hypervisor (132) may receive (500) a set (118) of processor identifiers for computer processors supported by the operating system (112) running in the logical partition (108) according to the method of FIG. 5 by retrieving, from the operating system (112), the set (118) of processor identifiers for computer processors supported by the operating system (112) using functions provided by an API of the operating system (112).

Figure 5:
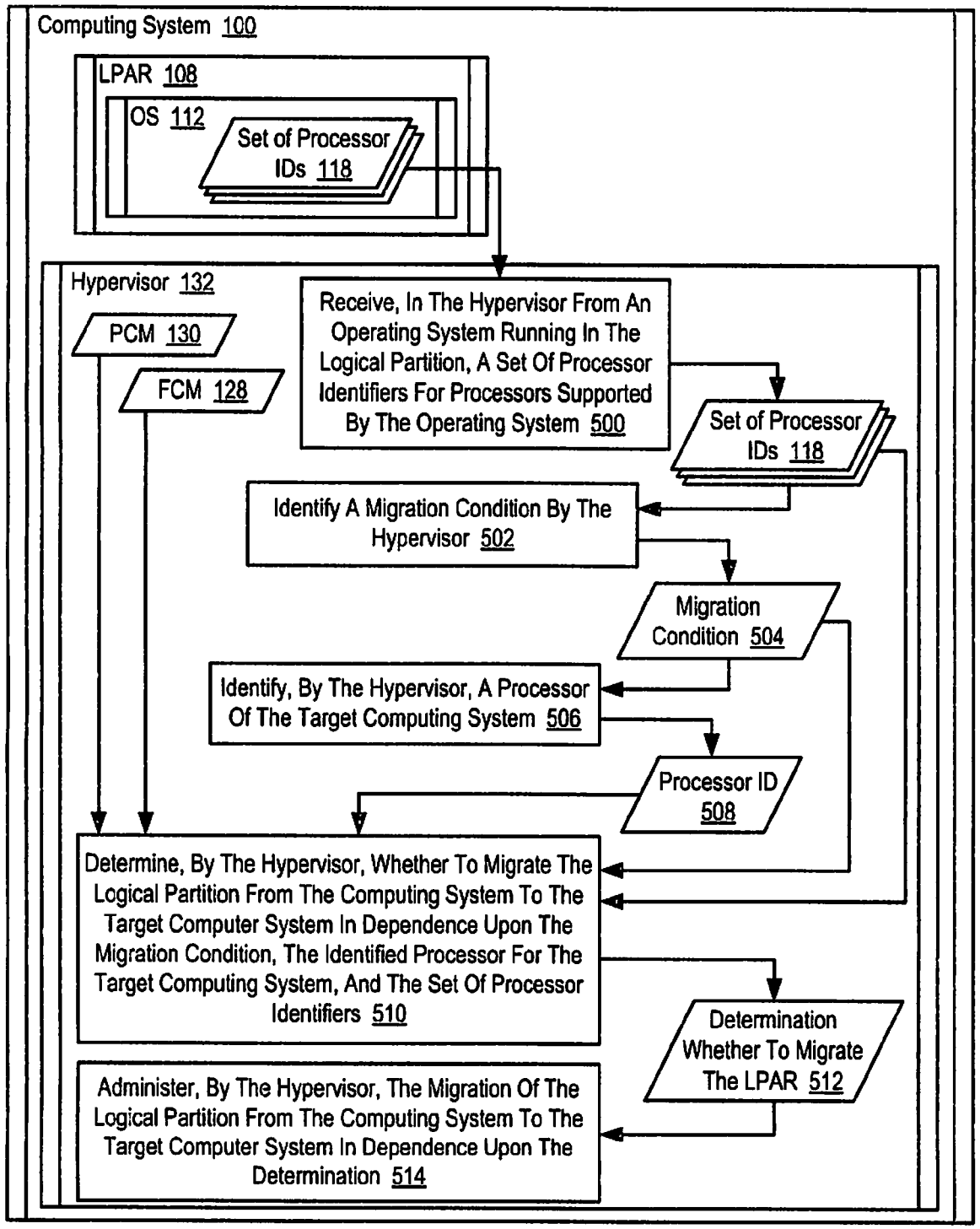
FIG. 5 sets forth a flow chart illustrating a further exemplary method for controlling an operational mode for a logical partition on a computing system according to embodiments of the present invention.

The method of FIG. 5 also includes identifying (502) a migration condition (504) by the hypervisor (132). The migration condition (504) of FIG. 5 represents a condition for migrating the logical partition (108) from the computing system to a target computing system. The hypervisor (132) may identify (502) a migration condition (504) according to the method of FIG. 5 in the same manner as identifying a migration condition described with reference to FIG. 4.

The method of FIG. 5 includes identifying (506), by the hypervisor (132), a processor of the target computing system. The hypervisor (132) may identify (506) a processor of the target computing system according to the method of FIG. 5 by requesting a hypervisor installed on the target computing system to retrieve a processor identifier (508) from a processor identification register and return the processor identifier (508) to the hypervisor (132) installed on the computer system (100). The hypervisor (132) may issue such a request through a data communications connection established with a hypervisor installed on the target computing system according to a data communications protocol such as, for example, TCP/IP, UDP/IP, or any other data communications protocols as will occur to those of skill in the art. The hypervisor (132) may also retrieve the processor identifier (508) for the processor of the target computing system using a pair of special logical partitions used for data communications between the hypervisor (132) and the hypervisor installed on the target computing system.

The method of FIG. 5 also includes determining (510), by the hypervisor, whether to migrate the logical partition (108) from the computing system (100) to the target computer system in dependence upon the migration condition (504), the identified processor (508) for the target computing system, and the set (118) of processor identifiers for computer processors supported by the operating system (112). The hypervisor (132) may determine whether to migrate the logical partition (108) from the computing system (100) to the target computer system according to the method of FIG. 5 by determining whether the processor identifier (508) for the target computing system matches one of the processor identifiers in the set (118) of processor identifiers for computer processors supported by the operating system (112). The hypervisor (132) of FIG. 5 may determine to migrate the logical partition (108) from the computing system (100) to the target computer system if the processor identifier (508) for the target computing system matches one of the processor identifiers in the set (118) of processor identifiers. In contrast, the hypervisor (132) of FIG. 5 may determine not to migrate the logical partition (108) from the computing system (100) to the target computer system if the processor identifier (508) for the target computing system does not match one of the processor identifiers in the set (118) of processor identifiers. In some embodiments, the operating system (112) may indicate that it is allowed to migrate to an implementation of a processor architecture version as long as there is no operating system errata associated with the processor implementation. So even though there may be processors on the target system capable of running at the processor architecture level of the effective processor compatibility mode, the hypervisor (132) may still determine not to migrate the partition (108) due to operating system errata that exists for the operating system (112) regarding the processor installed in the target computing system. The hypervisor (132) of FIG. 1 may store an indication of whether to migrate the logical partition (108) from the computing system (100) to the target computer system in determination (512).

Although FIG. 5 is discussed with reference to the hypervisor (132) determining whether to migrate the logical partition from the computing system (100) to the target computer system, readers will note that a determination whether to migrate the logical partition may be carried out by the hypervisor installed on the target computing system. In such an embodiment, the hypervisor (132) transmits the set (118) of processor identifiers to the hypervisor of the target computing system and allows the hypervisor of the target computing system to determine whether to migrate the logical partition from the computing system (100) to the target computer system in dependence upon the processor for the target computing system and the set (118) of processor identifiers for processors supported by operating system (112). The hypervisor of the target computing system may then return to the hypervisor (132) a value indicating the determination (414) whether to migrate the logical partition.

The method of FIG. 5 includes administering (514), by the hypervisor (132), the migration of the logical partition (108) from the computing system to the target computer system in dependence upon the determination (512). The hypervisor (132) may administer (514) the migration of the logical partition (108) according to the method of FIG. 5 by allowing the migration of the logical partition (108) from the computing system (100) to the target computer system if the determination (512) indicates that the hypervisor (132) determined to migrate the logical partition (108). The hypervisor (132) may also administer (514) the migration of the logical partition (108) according to the method of FIG. 5 by preventing the migration of the logical partition (108) from the computing system (100) to the target computer system if the determination (512) indicates that the hypervisor (132) determined not to migrate the logical partition (108). In such a manner, administering (514) migration of the logical partition (108) advantageously prevents the migration of the logical partition (108) to a target computing system having a processor not supported by the operating system (112) running in the logical partition (108).

Instead of using the processors supported by an operating system running in a logical partition to determine whether to migrate the logical partition to a target computing system, the hypervisor may also use the processors supported by an operating system running in a logical partition to administer the boot sequence of the logical partition. For further explanation, therefore, FIG. 6 sets forth a flow chart illustrating a further exemplary method for controlling an operational mode for a logical partition on a computing system according to embodiments of the present invention that includes receiving (600), during a boot sequence in the hypervisor (132) from an operating system (112) in the logical partition (108), a set (118) of processor identifiers for computer processors supported by the operating system (112) running in the logical partition (108).

A boot sequence is the set of operations performed by the computing system from the time the system is turned on until the time that the operating system completes its startup operations. The hypervisor (132) may receive (600), during a boot sequence from an operating system (112) in the logical partition (108), a set (118) of processor identifiers for computer processors supported by the operating system (112) running in the logical partition (108) according to the method of FIG. 6 by retrieving, from the operating system (112), the set (118) of processor identifiers for computer processors supported by the operating system (112) using functions provided by an interface between the operating system (112) and the firmware.

Figure 6:
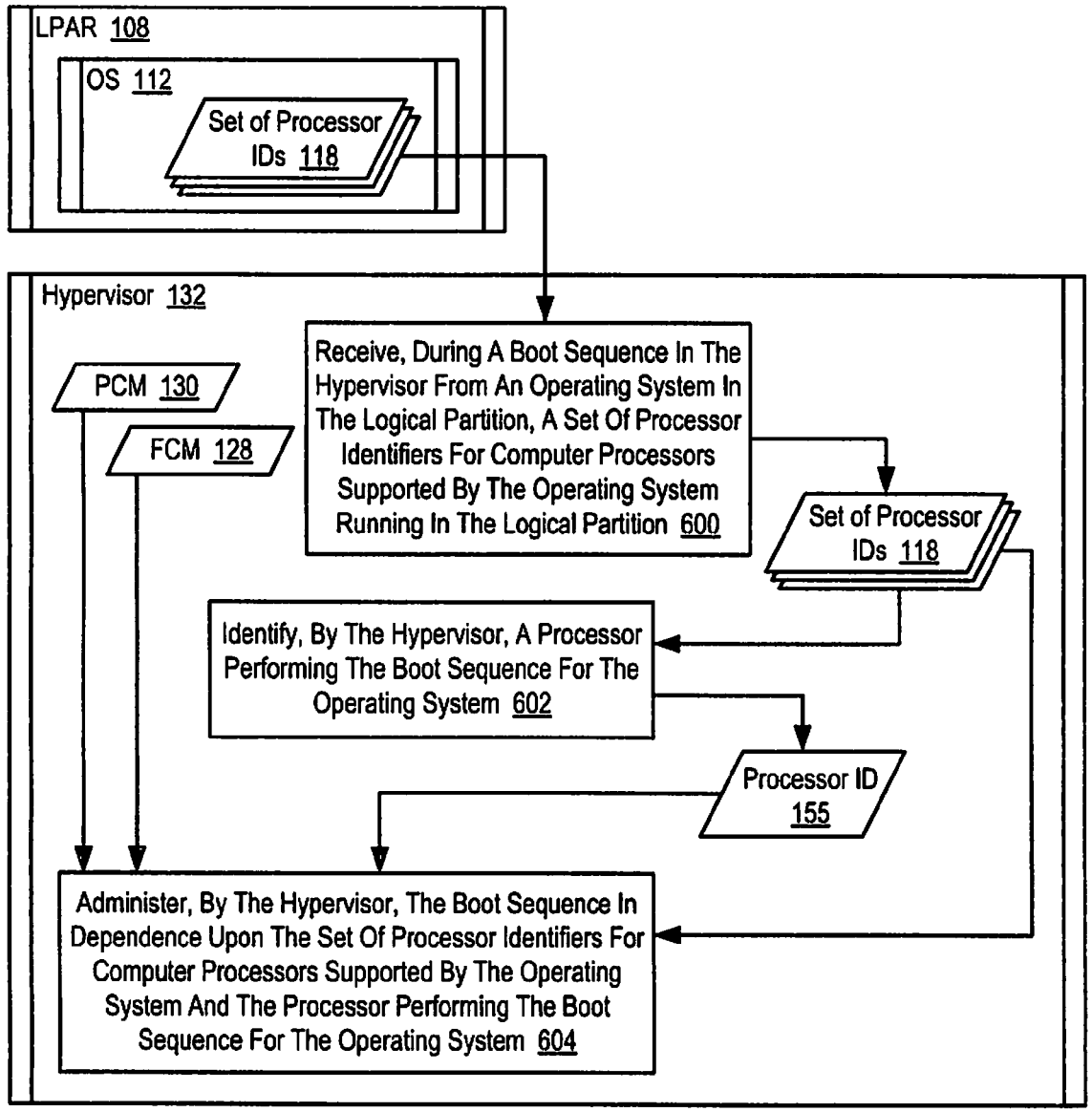
FIG. 6 sets forth a flow chart illustrating a further exemplary method for controlling an operational mode for a logical partition on a computing system according to embodiments of the present invention.

The method of FIG. 6 also includes identifying (602), by the hypervisor (132), a processor performing the boot sequence for the operating system (112). The hypervisor (132) may identify (602) a processor performing the boot sequence for the operating system (112) according to the method of FIG. 6 by retrieving a processor identifier (155) from a processor identification register of the processor performing the boot sequence for the operating system (112).

The method of FIG. 6 includes administering (604), by the hypervisor (132), the boot sequence in dependence upon the set (118) of processor identifiers for computer processors supported by the operating system (112) and the processor performing the boot sequence for the operating system (112). The hypervisor (132) may administer (604) the boot sequence according to the method of FIG. 6 by determining whether the processor identifier (155) of the processor performing the boot sequence matches one of the processor identifiers in the set (118) of processor identifiers for computer processors supported by the operating system (112) and allowing the boot sequence to continue if the processor identifier (155) of the processor performing the boot sequence matches one of the processor identifiers for the set (118) of processor identifiers for computer processors supported by the operating system (112). The hypervisor (132) may also administer (604) the boot sequence according to the method of FIG. 6 by aborting the boot sequence if the processor identifier (155) of the processor performing the boot sequence does not match one of the processor identifiers in the set (118) of processor identifiers for computer processors supported by the operating system (112). In some embodiments, the operating system (112) may indicate that it is allowed to boot on an implementation of a processor architecture version as long as there is no operating system errata associated with the processor implementation. So even though the processor performing the boot sequence is a suitable candidate for the operating system to boot on, the hypervisor (132) may still determine to abort the boot sequence due to operating system errata that exists for the operating system (112) regarding the processor performing the boot sequence. Administering (604) the boot sequence as described above advantageously prevents the operating system (112) from booting up in the logical partition (108) when the processor performing the boot sequence is not supported by the operating system (112) running in the logical partition (108).

Figure 7:
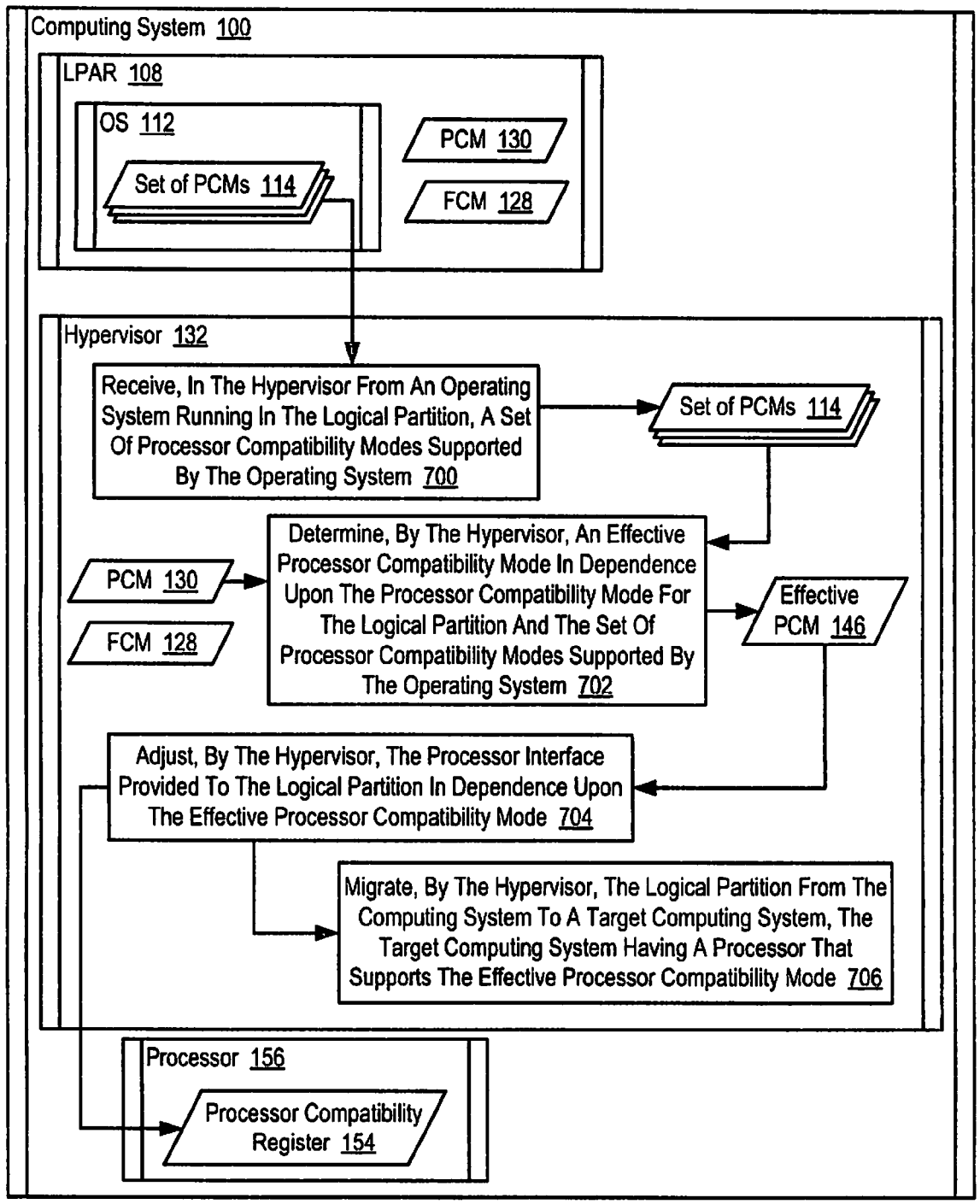
FIG. 7 sets forth a flow chart illustrating a further exemplary method for controlling an operational mode for a logical partition on a computing system according to embodiments of the present invention.

As discussed above with reference to FIG. 3, the hypervisor may provide a processor interface for a logical partition based on the processor compatibility mode configured in the logical partition. In some computing systems, however, an older operating system running in the logical partition might not support the processor interface provided according to the processor compatibility mode configured in the logical partition. In such computing systems, a hypervisor may have to adjust the processor interface to comport with processor compatibility modes supported by the operating system in the logical partition. For further explanation, therefore, FIG. 7 sets forth a flow chart illustrating a further exemplary method for controlling an operational mode for a logical partition on a computing system (100) according to embodiments of the present invention that includes adjusting (704), by the hypervisor (132), the processor interface provided to the logical partition (108). In the example of FIG. 7, the logical partition (108) includes a processor compatibility mode (130) and a firmware compatibility mode (128). A system administrator may configure the processor compatibility mode (130) and the firmware compatibility mode (128) as discussed above with reference to FIG. 3.

The method of FIG. 7 includes receiving (700), in the hypervisor (132) from an operating system (112) running in the logical partition (108), a set (114) of processor compatibility modes supported by the operating system (112). The hypervisor (132) may receive (700) a set (114) of processor compatibility modes supported by the operating system (112) according to the method of FIG. 7 by retrieving, from the operating system (112), the set (114) of processor compatibility modes supported by the operating system (112) using functions provided by an API of the operating system (112).

The method of FIG. 7 also includes determining (702), by the hypervisor (132), an effective processor compatibility mode (146) in dependence upon the processor compatibility mode (130) for the logical partition and the set (114) of processor compatibility modes supported by the operating system (112). The effective processor compatibility mode (146) represents a value specifying the processor architecture version supported by the operating system (112) that most closely matches the processor architecture version specified by the processor compatibility mode (130) for the logical partition (108). The hypervisor (132) may determine (702) an effective processor compatibility mode (146) according to the method of FIG. 7 by comparing the processor compatibility mode (130) received for the logical partition (108) with the set (114) of processor compatibility modes supported by the operating system (112) and selecting, as the effective processor compatibility mode (146), the processor compatibility mode from the set (114) that matches the processor compatibility mode (130) for the logical partition. If no match exists, the hypervisor (132) may determine (702) an effective processor compatibility mode (146) according to the method of FIG. 7 by selecting, as the effective processor compatibility mode (146), the processor compatibility mode from the set (114) that specifies the most recent processor architecture version.

The method of FIG. 7 also includes adjusting (704), by the hypervisor (132), the processor interface provided to the logical partition (108) in dependence upon the effective processor compatibility mode (146). The hypervisor (132) may adjust (704) the processor interface provided to the logical partition (108) according to the method of FIG. 7 by storing the value for the effective processor compatibility mode (146) in a processor compatibility register (154) of the physical processor (156) early in boot sequence for the logical partition (108). The hypervisor (132) may also adjust (704) the processor interface provided to the logical partition (108) according to the method of FIG. 7 by restarting the boot sequence for the logical partition (108) with the value for the effective processor compatibility mode (146) stored in the processor compatibility register (154) of the physical processor (156). Adjusting (704) the processor interface provided to the logical partition (108) as described above advantageously prevents the hypervisor from providing an unsupported processor interface to the operating system running in the logical partition in the event that a system administrator wants to run an older version of the operating system in the logical partition configured for a processor compatibility mode that is not supported by the operating system.

The method of FIG. 7 includes migrating (706), by the hypervisor (132), the logical partition (108) from the computing system (100) to a target computing system having a processor that supports the effective processor compatibility mode (146). The hypervisor (132) may migrate (706) the logical partition (108) from the computing system (100) to a target computing system by identifying a migration condition, determining whether the target computing system has a processor that supports the processor architecture version specified by the effective processor compatibility mode (146), and transmitting the logical partition data to a hypervisor installed on the target computing system if the migration condition is satisfied and the target computing system has a processor that supports the processor architecture version specified by the effective processor compatibility mode (146). The hypervisor (132) may transmit partition data through a data communications connection established with a hypervisor installed on the target computing system according to a data communications protocol such as, for example, TCP/IP, UDP/IP, or any other data communications protocols as will occur to those of skill in the art. The hypervisor (132) may also transmit partition data using a pair of special logical partitions used for data communications between the hypervisor (132) and the hypervisor installed on the target computing system.

Readers will note that determining whether the target computing system has a processor that supports the processor architecture version specified by the effective processor compatibility mode (146) may be carried out by either the hypervisor (132) installed on the computing system (100) or the hypervisor installed on the target computing system. When carried out by the hypervisor installed on the target computing system, the hypervisor (132) of computing system (100) transmits the effective processor compatibility mode (146) to the hypervisor of the target computing system and allows the hypervisor installed on the target computing system to make the determination whether to migrate the logical partition. After determining whether to migrate the logical partition, the hypervisor of the target computing system returns a result of the determination to the hypervisor (132) installed on the computing system (100).

Figure 8:
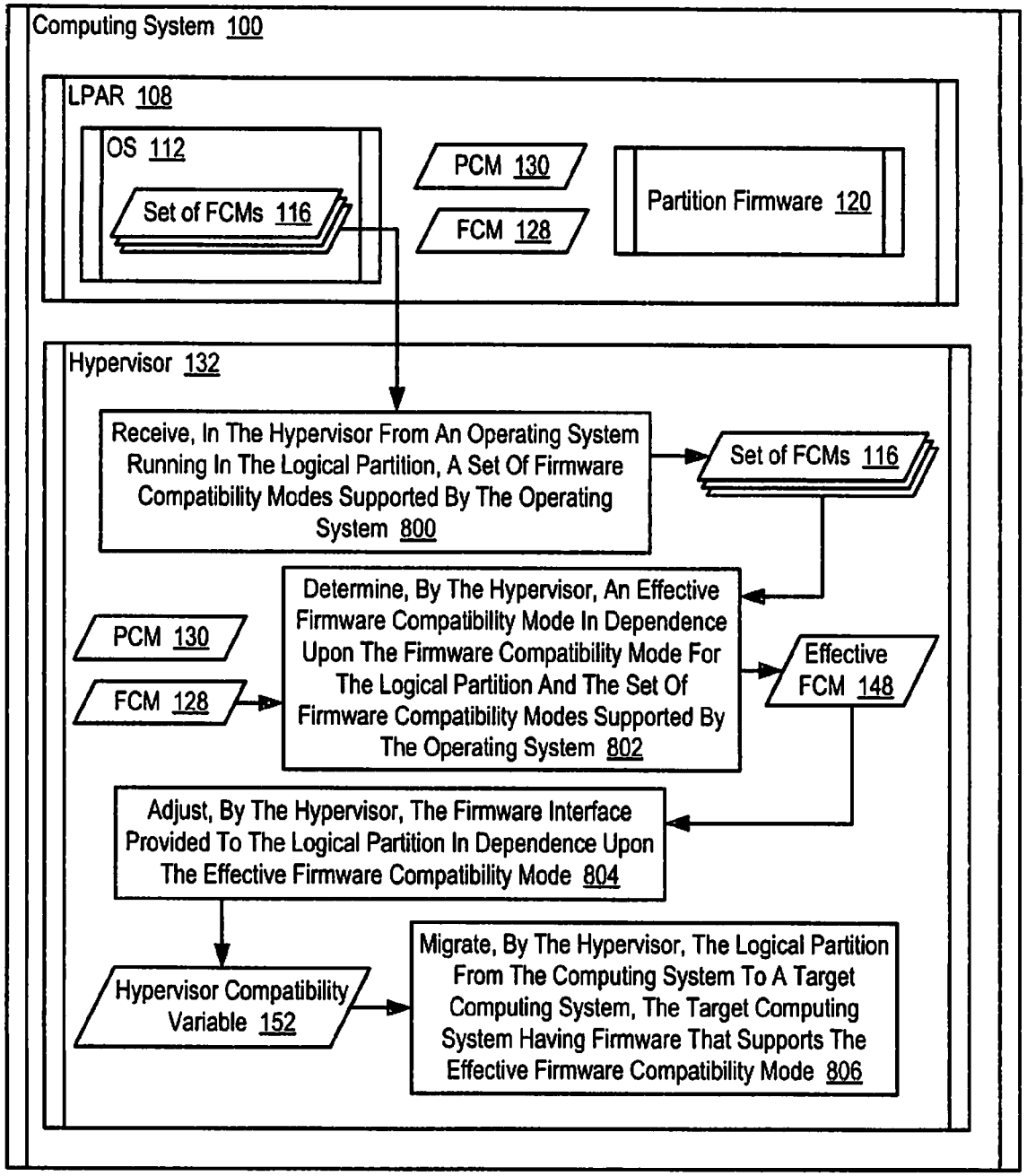
FIG. 8 sets forth a flow chart illustrating a further exemplary method for controlling an operational mode for a logical partition on a computing system according to embodiments of the present invention.

As discussed above with reference to FIG. 3, the hypervisor may provide a firmware interface for a logical partition based on the firmware compatibility mode configured in the logical partition. In some computing systems, however, an older operating system running in the logical partition might not support the firmware interface provided according to the firmware compatibility mode configured in the logical partition. In such computing systems, a hypervisor may have to adjust the firmware interface to comport with firmware compatibility modes supported by the operating system in the logical partition. For further explanation, therefore, FIG. 8 sets forth a flow chart illustrating a further exemplary method for controlling an operational mode for a logical partition on a computing system (100) according to embodiments of the present invention that includes adjusting (804), by the hypervisor (132), the firmware interface provided to the logical partition (108). In the example of FIG. 8, the logical partition (108) includes a processor compatibility mode (130) and a firmware compatibility mode (128). A system administrator may configure the processor compatibility mode (130) and the firmware compatibility mode (128) as discussed above with reference to FIG. 3.

The method of FIG. 8 includes receiving (800), in the hypervisor (132) from an operating system (112) running in the logical partition (108), a set (116) of firmware compatibility modes supported by the operating system (112). The hypervisor (132) may receive (800), from an operating system (112) running in the logical partition (108), a set (116) of firmware compatibility modes supported by the operating system (112) according to the method of FIG. 8 by retrieving, from the operating system (112), the set (116) of firmware compatibility modes supported by the operating system (112) using functions provided by an API of the operating system (112).

The method of FIG. 8 also includes determining (802), by the hypervisor (132), an effective firmware compatibility mode (148) in dependence upon the firmware compatibility mode (128) for the logical partition and the set (116) of firmware compatibility modes supported by the operating system (112). The effective firmware compatibility mode (148) represents a value specifying the firmware architecture version supported by the operating system (112) that most closely matches the firmware architecture version specified by the firmware compatibility mode (128) for the logical partition (108). The hypervisor (132) may determine (802) an effective firmware compatibility mode (148) according to the method of FIG. 8 by comparing the firmware compatibility mode (128) received for the logical partition (108) with the set (116) of firmware compatibility modes supported by the operating system (112) and selecting, as the effective firmware compatibility mode (148), the firmware compatibility mode from the set (116) that matches the firmware compatibility mode (128) for the logical partition (108). If no match exists, the hypervisor (132) may determine (802) an effective firmware compatibility mode (148) according to the method of FIG. 8 by selecting, as the effective firmware compatibility mode (148), the firmware compatibility mode from the set (116) that specifies the most recent firmware architecture version.

The method of FIG. 8 also includes adjusting (804), by the hypervisor (132), the firmware interface provided to the logical partition (108) in dependence upon the effective firmware compatibility mode (148). The hypervisor (132) may adjust (804) the firmware interface provided to the logical partition (108) by the hypervisor (132) and partition firmware (120) according to the method of FIG. 8 by storing the value for the effective firmware compatibility mode (148) in a hypervisor compatibility variable (152) early in boot sequence for the logical partition (108). The hypervisor (132) may also adjust (804) the firmware interface provided to the logical partition (108) according to the method of FIG. 8 by restarting the boot sequence for the logical partition (108) with the value for the effective firmware compatibility mode (148) stored in the hypervisor compatibility variable (152). Adjusting (804) the firmware interface provided to the logical partition (108) as described above advantageously prevents the hypervisor from providing an unsupported firmware interface to the operating system running in the logical partition in the event that a system administrator wants to run an older version of the operating system in the logical partition configured for a firmware compatibility mode that is not supported by the operating system.

The method of FIG. 8 includes migrating (806), by the hypervisor (132), the logical partition (108) from the computing system (100) to a target computing system having firmware that supports the effective firmware compatibility mode (148). The hypervisor (132) may migrate (806) the logical partition (108) from the computing system (100) to a target computing system according to the method of FIG. 8 by identifying a migration condition, determining whether the target computing system has firmware that supports the firmware architecture version specified by the effective firmware compatibility mode (148), and transmitting the logical partition data to a hypervisor installed on the target computing system if the migration condition is satisfied and the target computing system has firmware that supports the firmware architecture version specified by the effective firmware compatibility mode (148). The hypervisor (132) may transmit partition data through a data communications connection established with a hypervisor installed on the target computing system according to a data communications protocol such as, for example, TCP/IP, UDP/IP, or any other data communications protocols as will occur to those of skill in the art. The hypervisor (132) may also transmit partition data using a pair of special logical partitions used for data communications between the hypervisor (132) and the hypervisor installed on the target computing system.

Readers will note that determining whether the target computing system has firmware that supports the firmware architecture version specified by the effective firmware compatibility mode (148) may be carried out by either the hypervisor (132) installed on the computing system (100) or the hypervisor installed on the target computing system. When carried out by the hypervisor installed on the target computing system, the hypervisor (132) of the computing system (100) transmits the effective firmware compatibility mode (148) to the hypervisor of the target computing system and allows the hypervisor installed on the target computing system to make the determination whether to migrate the logical partition. After determining whether to migrate the logical partition, the hypervisor of the target computing system returns a result of the determination to the hypervisor (132) installed on the computing system (100).

Exemplary embodiments of the present invention are described largely in the context of a fully functional computer system for controlling an operational mode for a logical partition on a computing system. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of controlling an operational mode for a logical partition on a computing system, the method comprising:
    receiving, in a hypervisor installed on the computing system, a processor compatibility mode for the logical partition and a firmware compatibility mode for the logical partition, the processor compatibility mode specifying a processor architecture version configured for the logical partition, and the firmware compatibility mode specifying a firmware architecture version configured for the logical partition;
    providing, by the hypervisor for the logical partition, a firmware interface in dependence upon the firmware compatibility mode; and
    providing, by the hypervisor for the logical partition, a processor interface in dependence upon the processor compatibility mode.

2. The method of claim 1 further comprising configuring for the logical partition the processor compatibility mode and the firmware compatibility mode.

3. The method of claim 1 further comprising:
    receiving, in the hypervisor from an operating system running in the logical partition, a set of processor compatibility modes supported by the operating system;
    determining, by the hypervisor, an effective processor compatibility mode in dependence upon the processor compatibility mode for the logical partition and the set of processor compatibility modes supported by the operating system; and
    adjusting, by the hypervisor, the processor interface provided to the logical partition in dependence upon the effective processor compatibility mode.

4. The method of claim 3 further comprising migrating, by the hypervisor, the logical partition from the computing system to a target computing system, the target computing system having a processor that supports the effective processor compatibility mode.

5. The method of claim 1 further comprising:
    receiving, in the hypervisor from an operating system running in the logical partition, a set of firmware compatibility modes supported by the operating system;
    determining, by the hypervisor, an effective firmware compatibility mode in dependence upon the firmware compatibility mode for the logical partition and the set of firmware compatibility modes supported by the operating system; and
    adjusting, by the hypervisor, the firmware interface provided to the logical partition in dependence upon the effective firmware compatibility mode.

6. The method of claim 5 further comprising migrating, by the hypervisor, the logical partition from the computing system to a target computing system, the target computing system having firmware that supports the effective firmware compatibility mode.

7. The method of claim 1 further comprising:
    identifying a migration condition by the hypervisor, the migration condition specifying a condition for migrating the logical partition from the computing system to a target computing system;
    identifying, by the hypervisor, a processor architecture version for the target computing system;
    identifying, by the hypervisor, a firmware architecture version for the target computing system;
    determining, by the hypervisor, whether to migrate the logical partition from the computing system to the target computer system in dependence upon the migration condition, the processor compatibility mode, the firmware compatibility mode, the processor architecture version for the target computing system, and the firmware architecture version for the target computing system; and
    administering, by the hypervisor, migration of the logical partition from the computing system to the target computer system in dependence upon the determination.

8. The method of claim 1 further comprising:
    receiving, in the hypervisor from an operating system running in the logical partition, a set of processor identifiers for computer processors supported by the operating system;
    identifying a migration condition by the hypervisor, the migration condition specifying a condition for migrating the logical partition from the computing system to a target computing system;
    identifying, by the hypervisor, a processor of the target computing system;
    determining, by the hypervisor, whether to migrate the logical partition from the computing system to the target computer system in dependence upon the migration condition, the identified processor for the target computing system, and the set of processor identifiers for computer processors supported by the operating system; and
    administering, by the hypervisor, the migration of the logical partition from the computing system to the target computer system in dependence upon the determination.

9. The method of claim 1 further comprising:
    receiving, during a boot sequence in the hypervisor from an operating system in the logical partition, a set of processor identifiers for computer processors supported by the operating system running in the logical partition;

identifying, by the hypervisor, a processor performing the boot sequence for the operating system; and administering, by the hypervisor, the boot sequence in dependence upon the set of processor identifiers for computer processors supported by the operating system and the processor performing the boot sequence for the operating system.

10. Apparatus for controlling an operational mode for a logical partition on a computing system, the apparatus comprising a computer processor, a computer memory operatively coupled to the computer processor, the computer memory having disposed within it computer program instructions capable of:

receiving, in a hypervisor installed on the computing system, a processor compatibility mode for the logical partition and a firmware compatibility mode for the logical partition, the processor compatibility mode specifying a processor architecture version configured for the logical partition, and the firmware compatibility mode specifying a firmware architecture version configured for the logical partition;

providing, by the hypervisor for the logical partition, a firmware interface in dependence upon the firmware compatibility mode; and providing, by the hypervisor for the logical partition, a processor interface in dependence upon the processor compatibility mode.

11. The apparatus of claim 10 further comprising computer program instructions capable of:

receiving, in the hypervisor from an operating system running in the logical partition, a set of processor compatibility modes supported by the operating system;

determining, by the hypervisor, an effective processor compatibility mode in dependence upon the processor compatibility mode for the logical partition and the set of processor compatibility modes supported by the operating system; and adjusting, by the hypervisor, the processor interface provided to the logical partition in dependence upon the effective processor compatibility mode.

12. The apparatus of claim 10 further comprising computer program instructions capable of:

receiving, in the hypervisor from an operating system running in the logical partition, a set of firmware compatibility modes supported by the operating system;

determining, by the hypervisor, an effective firmware compatibility mode in dependence upon the firmware compatibility mode for the logical partition and the set of firmware compatibility modes supported by the operating system; and adjusting, by the hypervisor, the firmware interface provided to the logical partition in dependence upon the effective firmware compatibility mode.

13. The apparatus of claim 10 further comprising computer program instructions capable of:

identifying a migration condition by the hypervisor, the migration condition specifying a condition for migrating the logical partition from the computing system to a target computing system;

identifying, by the hypervisor, a processor architecture version for the target computing system;

identifying, by the hypervisor, a firmware architecture version for the target computing system;

determining, by the hypervisor, whether to migrate the logical partition from the computing system to the target computer system in dependence upon the migration condition, the processor compatibility mode, the firmware compatibility mode, the processor architecture version for the target computing system, and the firmware architecture version for the target computing system; and administering, by the hypervisor, migration of the logical partition from the computing system to the target computer system in dependence upon the determination.

14. The apparatus of claim 10 further comprising computer program instructions capable of:

receiving, in the hypervisor from an operating system running in the logical partition, a set of processor identifiers for computer processors supported by the operating system;

identifying a migration condition by the hypervisor, the migration condition specifying a condition for migrating the logical partition from the computing system to a target computing system;

identifying, by the hypervisor, a processor of the target computing system;

determining, by the hypervisor, whether to migrate the logical partition from the computing system to the target computer system in dependence upon the migration condition, the identified processor for the target computing system, and the set of processor identifiers for computer processors supported by the operating system; and administering, by the hypervisor, the migration of the logical partition from the computing system to the target computer system in dependence upon the determination.

15. A computer program product for controlling an operational mode for a logical partition on a computing system, the computer program product disposed in a computer-readable, recordable storage medium, the computer program product comprising computer program instructions capable of:

receiving, in a hypervisor installed on the computing system, a processor compatibility mode for the logical partition and a firmware compatibility mode for the logical partition, the processor compatibility mode specifying a processor architecture version configured for the logical partition, and the firmware compatibility mode specifying a firmware architecture version configured for the logical partition;

providing, by the hypervisor for the logical partition, a firmware interface in dependence upon the firmware compatibility mode; and providing, by the hypervisor for the logical partition, a processor interface in dependence upon the processor compatibility mode.

16. The computer program product of claim 15 further comprising computer program instructions capable of:

receiving, in the hypervisor from an operating system running in the logical partition, a set of processor compatibility modes supported by the operating system;

determining, by the hypervisor, an effective processor compatibility mode in dependence upon the processor compatibility mode for the logical partition and the set of processor compatibility modes supported by the operating system; and adjusting, by the hypervisor, the processor interface provided to the logical partition in dependence upon the effective processor compatibility mode.

17. The computer program product of claim 16 further comprising computer program instructions capable of migrating, by the hypervisor, the logical partition from the computing system to a target computing system, the target computing system having a processor that supports the effective processor compatibility mode.

18. The computer program product of claim 15 further comprising computer program instructions capable of:
- receiving, in the hypervisor from an operating system running in the logical partition, a set of firmware compatibility modes supported by the operating system;
- determining, by the hypervisor, an effective firmware compatibility mode in dependence upon the firmware compatibility mode for the logical partition and the set of firmware compatibility modes supported by the operating system; and
- adjusting, by the hypervisor, the firmware interface provided to the logical partition in dependence upon the effective firmware compatibility mode.

19. The computer program product of claim 18 further comprising computer program instructions capable of migrating, by the hypervisor, the logical partition from the computing system to a target computing system, the target computing system having firmware that supports the effective firmware compatibility mode.

20. The computer program product of claim 15 further comprising computer program instructions capable of:
- identifying a migration condition by the hypervisor, the migration condition specifying a condition for migrating the logical partition from the computing system to a target computing system;
- identifying, by the hypervisor, a processor architecture version for the target computing system;
- identifying, by the hypervisor, a firmware architecture version for the target computing system;
- determining, by the hypervisor, whether to migrate the logical partition from the computing system to the target computer system in dependence upon the migration condition, the processor compatibility mode, the firmware compatibility mode, the processor architecture version for the target computing system, and the firmware architecture version for the target computing system; and
- administering, by the hypervisor, migration of the logical partition from the computing system to the target computer system in dependence upon the determination.

21. The computer program product of claim 15 further comprising computer program instructions capable of:
- receiving, in the hypervisor from an operating system running in the logical partition, a set of processor identifiers for computer processors supported by the operating system;
- identifying a migration condition by the hypervisor, the migration condition specifying a condition for migrating the logical partition from the computing system to a target computing system;
- identifying, by the hypervisor, a processor of the target computing system;
- determining, by the hypervisor, whether to migrate the logical partition from the computing system to the target computer system in dependence upon the migration condition, the identified processor for the target computing system, and the set of processor identifiers for computer processors supported by the operating system; and
- administering, by the hypervisor, the migration of the logical partition from the computing system to the target computer system in dependence upon the determination.

22. The computer program product of claim 15 further comprising computer program instructions capable of:
- receiving, during a boot sequence in the hypervisor from an operating system in the logical partition, a set of processor identifiers for computer processors supported by the operating system running in the logical partition;
- identifying, by the hypervisor, a processor performing the boot sequence for the operating system; and
- administering, by the hypervisor, the boot sequence in dependence upon the set of processor identifiers for computer processors supported by the operating system and the processor performing the boot sequence for the operating system.

* * * * *